United States Patent [19]
Palmer

[11] Patent Number: 5,687,034
[45] Date of Patent: Nov. 11, 1997

[54] MOUNTING ADAPTER FOR COUPLING AN OPTICAL DEVICE TO A NIGHT VISION DEVICE

[75] Inventor: Gary Lynn Palmer, Vinton, Va.

[73] Assignee: ITT Defense, Inc., McLean, Va.

[21] Appl. No.: 584,662

[22] Filed: Jan. 11, 1996

[51] Int. Cl.$^6$ .................................................. G02B 7/02
[52] U.S. Cl. .................... 359/827; 359/894; 359/744; 359/418; 359/829
[58] Field of Search ................................. 359/827, 829, 359/809, 414, 418, 744, 641, 407, 894, 600

[56] References Cited

U.S. PATENT DOCUMENTS

| | | | |
|---|---|---|---|
| 2,942,539 | 6/1960 | Geddes | 359/829 |
| 3,418,032 | 12/1968 | Kajiro | 359/418 |
| 3,761,162 | 9/1973 | Hall | 359/829 |
| 4,955,702 | 9/1990 | Nakamura | 359/418 |
| 5,138,487 | 8/1992 | Ahn | 359/744 |
| 5,157,553 | 10/1992 | Phillips . | |
| 5,223,974 | 6/1993 | Phillips . | |
| 5,267,079 | 11/1993 | Riedl | 359/418 |
| 5,299,067 | 3/1994 | Kutz et al. | 359/827 |
| 5,455,711 | 10/1995 | Palmer | 359/418 |

*Primary Examiner*—Loha Ben
*Attorney, Agent, or Firm*—Plevy & Associates

[57] ABSTRACT

A mounting adapter for coupling a TV lens or other type of lens to a night vision device is provided. The mounting adapter is a longitudinal tubular member that has an exterior surface that tapers from a wider first end to a narrower second end. The interior surface of the wider first end includes a first threaded region to removably couple the mounting adapter to a night vision device. A second threaded region is located on the interior surface of the narrower second end for removably coupling a TV lens or other optical device to the mounting adapter. The mounting adapter defines a cavity for receiving a portion of an image intensifier tube, this cavity being located just past the first threaded region. At the end of the cavity there is defined an annular-shaped seat which abuts against the image intensifier tube when the mounting adapter is coupled to the night vision device. A third threaded region for receiving an annular lens retainer is located between the annular-shaped seat and the second threaded region.

14 Claims, 2 Drawing Sheets

MOUNTING ADAPTER FOR COUPLING AN OPTICAL DEVICE TO A NIGHT VISION DEVICE

FIELD OF THE INVENTION

This invention relates generally to night vision devices. Specifically the present invention relates to a mounting adapter for mounting a non-standard lens or other optical device to an AN/PVS-7B or other night vision device.

BACKGROUND OF THE INVENTION

Night vision devices are widely used to provide military and other personnel with the ability to view objects or take pictures at night or during other low light conditions. Recently, civilians have begun to use night vision devices on boats for navigational purposes or to take photographs of various objects or scenes at night. Most night vision devices utilize an image intensifier tube that receives low intensity visible or non-visible light from starlight and moonlight and converts the low intensity light into a visible image. A well known example is a night vision device used by the military called the AN/PVS-7B. As exemplified by the AN/PVS-7B, most night vision devices are equipped with a focusable objective lens assembly that allows a user to focus on an object to be viewed.

The AN/PVS-7B night vision device comes equipped with a standard objective lens that has predetermined optical characteristics. These factory predetermined optical characteristics are suitable for many civilian and military uses. There are some situations, however, where it might be desirable to substitute a lens that has different optical characteristics. For example, a user might want to attach the night vision device to a TV lens, a wide angle lens, a zoom lens, a telephoto lens, a specialty lens, or other lens having different optical characteristics. It would, therefore, be an advantage if a user could remove the standard objective lens assembly that the night vision device comes equipped with, and replace it with one of the substitute optical devices listed above.

The problem presented is twofold. First, the AN/PVS-7B has an externally threaded cylindrical projecting housing section for attaching a standard issue objective lens. TV lenses and many other optical devices also have a male threaded mounting regions. Since both the night vision device and the lens have threaded male mounting members, a need has developed for a mounting adapter to couple the devices.

The second problem is that the threaded housing section on the AN/PVS-7B has a predetermined diameter and a predetermined thread size and configuration. TV lenses and other optical devices may have a threaded mounting region that is of a different diameter and/or a different thread size and configuration than the AN/PVS-7B. Hence, there is a need for a mounting adapter that is configured to overcome the difference in size and configuration of the threaded mounting regions of the night vision device and the TV lens or other optical device.

It is therefore an objective of the present invention to provide a mounting adapter that enables a TV lens or other substitute lens to be coupled to a night vision device in lieu of the standard objective lens.

SUMMARY OF THE INVENTION

The present invention is a mounting adapter for coupling a TV lens or other type of lens to a night vision device thereby replacing the standard objective lens. The mounting adapter is a longitudinal tubular member that has an exterior surface that tapers from a wider first end to a narrower second end. The interior surface of the wider first end includes a first threaded region to removably couple the mounting adapter to a night vision device. A second threaded region is located on the interior surface of the narrower second end for removably coupling a TV lens or other optical device to the mounting adapter. The mounting adapter defines a cavity for receiving a portion of an image intensifier tube, this cavity being located just past the first threaded region. At the end of the cavity there is defined an annular-shaped seat which abuts against the image intensifier tube when the mounting adapter is coupled to the night vision device. A third threaded region for receiving an annular lens retainer is located between the annular-shaped seat and the second threaded region.

DETAILED DESCRIPTION OF THE INVENTION

Although the mounting adapter of the present invention can be used in many different applications where it is desirable to connect a separate optical device to a night vision device, the present invention is particularly well suited for coupling a TV lens or other optical device to an AN/PVS-7B night vision device. As such, the present invention will be described in connection with coupling a TV lens to an AN/PVS-7B night vision device in order to set forth the best mode contemplated for the invention.

Figure 1:
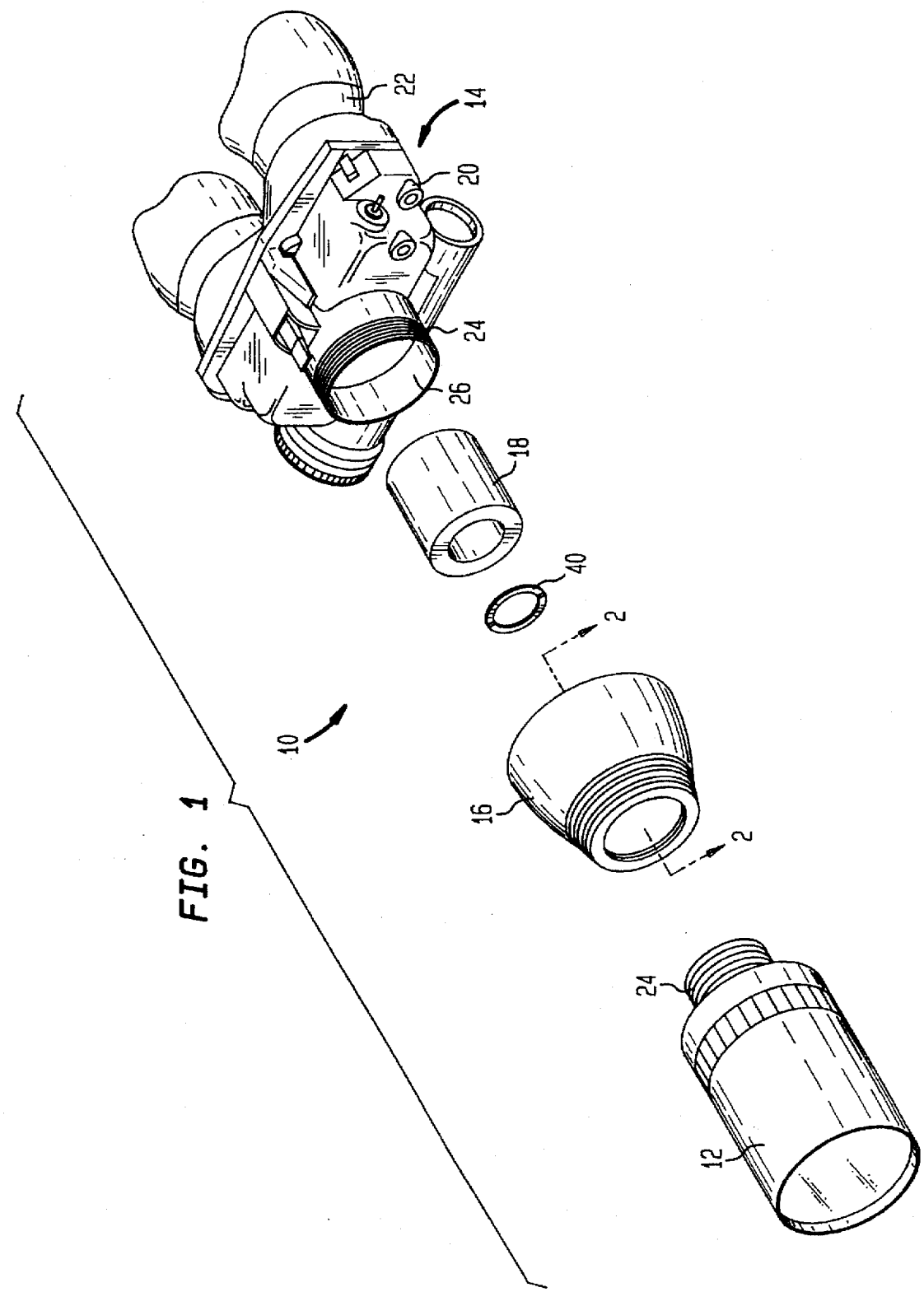
FIG. 1 is an exploded perspective view of the present invention.

Referring to FIG. 1, there is shown an exploded perspective view of the night vision assembly 10. The TV lens 12 is coupled to an AN/PVS-7B night vision device 14 via the mounting adapter 16 of the present invention. As is well known in the art, a night vision device includes an image intensifier tube 18 that receives very small amounts of visible and non-visible light from the moon, stars and night sky and amplifies the light. The AN/PVS-7B includes a body 20, a collimator for re-imaging the single source image received from the image intensifier tube 18 and creating two distinct optical paths, and two ocular assemblies 22. The optical system of the AN/PVS-7B is generally depicted in U.S. Pat. No. 5,157,553 entitled COLLIMATOR FOR BINOCULAR VIEWING SYSTEM issued to Phillips on Oct. 20, 1992 and assigned to ITT Corporation, the assignee herein, and by U.S. Pat. No. 5,223,974 entitled COLLIMATOR FOR BINOCULAR VIEWING SYSTEM issued to Phillips on Jun. 29, 1993 and assigned to ITT Corporation, the assignee herein.

The body 20 of the AN/PVS-7B night vision device 14 includes an externally threaded cylindrical projecting housing section 24. The housing section 24 defines a cavity 26 configured to receive a portion of the image intensifier tube 18. The exterior surface of the housing section 24 includes threads configured to attach a standard objective lens to the AN/PVS-7B night vision device 14.

The TV lens 12 includes an externally threaded cylindrical male mounting section 28 having threads of a size and configuration suitable for attaching the lens to a TV camera or other optical device. As discussed earlier, the TV lens 12 can not be coupled directly to the night vision device 14 for two reasons. First, the mounting section 28 of the TV lens 12 and the housing section 24 of the AN/PVS-7B night vision device 14 are both male members. Second, the diameter of the mounting section 28 on the TV lens 12 is substantially smaller than the diameter of the housing section 24 of the AN/PVS-7B night vision device 14. In order to couple the TV lens 12 to the night vision device 14, the present invention mounting adapter 16 is provided.

Figure 2:
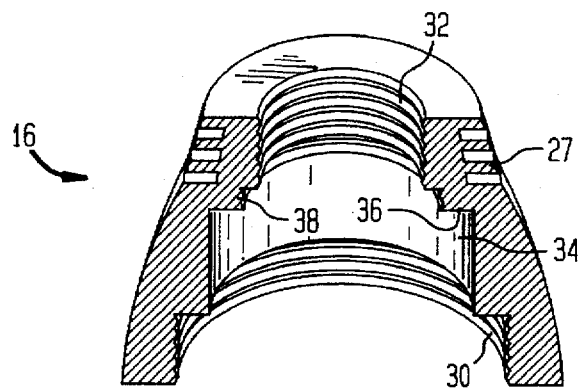
FIG. 2 is a cross-sectional view of the mounting adapter of the present invention taken along line 2—2 of FIG. 1.

FIG. 2 shows a cross-sectional view of the mounting adapter 16 of FIG. 1 shown along the line 2—2. The mounting adapter 16 can be molded from plastic or metal or any other rigid material. As can be seen, the mounting adapter 16 is a longitudinal tubular member that is symmetrical about a longitudinal axis and has an exterior surface that tapers from a wider first end to a narrower second end. The tapering of the external surface eases installation of the TV lens to the mounting adapter, enhances the aesthetic appearance of the assembly, and eases focusing of the lens. The narrower second end includes a plurality of fins 27 on the exterior surface that improves the tactile feel and facilitates installation and removal of the mounting adapter 16.

The interior surface of the mounting adapter 16 adjacent to the wider first end includes a first threaded region 30 for removably coupling the mounting adapter 16 to the AN/PVS-7B night vision device 14. The interior surface of the mounting adapter adjacent to the narrower second end includes a second threaded region 32 for removably coupling a TV lens thereto. Just past the first threaded region 30 there is a cavity 34 for receiving the remaining portion of the image intensifier tube. The cavity 34 has a diameter that is slightly larger than the diameter of the image intensifier tube. At the end of the cavity 34 is an annular-shaped seat 36 which abuts against the image intensifier tube when the mounting adapter is installed on the AN/PVS-7B night vision device. A third threaded region 38 for receiving a lens retainer is located between the annular-shaped seat 36 and the second threaded region 32.

The lens or filter retainer 40 (FIG. 1) is an externally threaded annular ring shaped member with substantially flat end surfaces. Two slots are provided on one of the flat end surfaces of the retainer 40 to receive an installation tool. The retainer 40 is threaded into the third thread region 38 and is utilized to retain a protective non-magnifying lens or other optical device.

Figure 3:
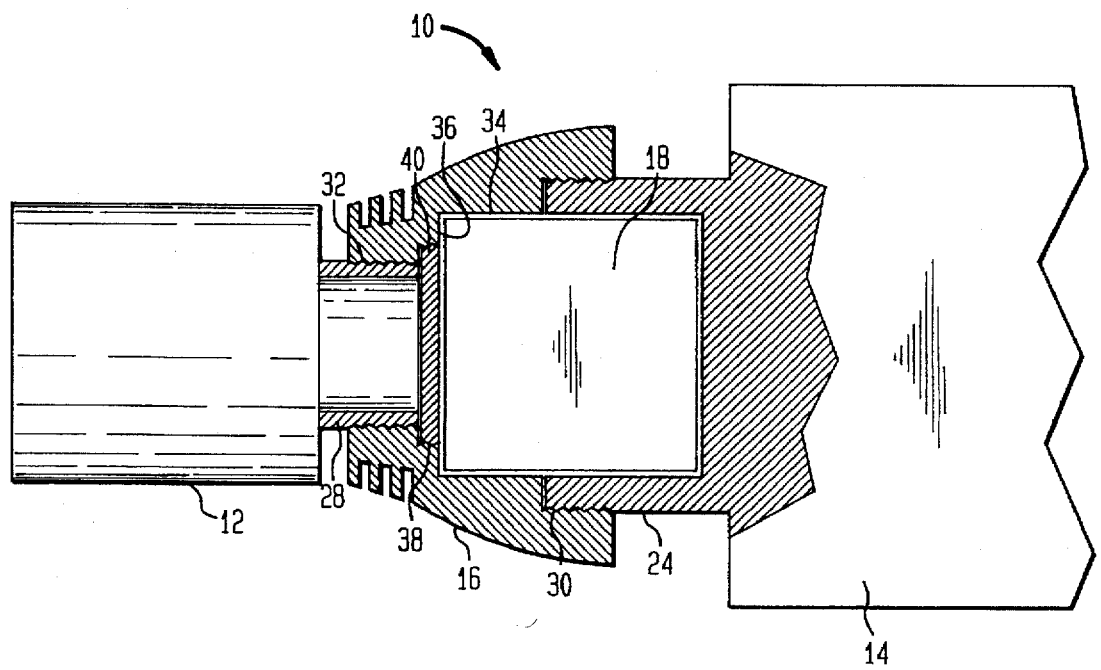
FIG. 3 is a partially cross-sectioned view of the night vision assembly of the present invention night vision assembly.

FIG. 3 depicts a partially cross-sectioned view of the assembled night vision assembly 10 of FIG. 1 wherein the TV lens 12 is coupled to the AN/PVS-7B night vision device 14 via the mounting adapter 16. The mounting adapter 16 is first assembled by threading the lens retainer 40 into the third threaded region 38. If desired, a protective non-magnifying lens or other optical device can be introduced into the assembly at this point. The mounting adapter 16 is then coupled to the AN/PVS-7B night vision device 14 by engaging the first threaded region 30 of the mounting adapter 16 with the threads of the housing section 24 of the night vision device 14. As the mounting adapter 16 is threaded to the night vision device 14, the image intensifier tube 18 enters the cavity 34 of the mounting adapter 16 and then abuts against the annular-shaped seat 36. The image intensifier tube 18 is thereby retained within a compartment formed by the mounting adapter 16 and the night vision device 14. The TV lens 12 having the male threaded mounting section 28 can now be coupled to the second threaded region 32 of the mounting adapter 16.

It will be understood that the mounting adapter, as well as the overall assembly, described herein are merely exemplary and that a person skilled in the art may make variations and modifications to the described embodiments utilizing functionally equivalent components to those described herein. All such variations and modifications are intended to be included within the scope of this invention as defined by the appended claims.

I claim:

1. A mounting adapter for mounting an optical device to a night vision device wherein said optical device has an externally threaded male housing section, and said night vision device has an externally threaded male mounting section, said mounting adapter comprising:

a longitudinal tubular member having a first end and a second end and an exterior surface defined therebetween, wherein the exterior surface of said longitudinal tubular member tapers continuously from said first end to said second end;

a first internally threaded region disposed on the internal surface of said first end of said longitudinal tubular member, said first threaded region for receiving the externally threaded male section of the night vision device; and a second internally threaded region disposed on the internal surface of said second end of said longitudinal tubular member, said second threaded region for receiving the externally threaded male housing section of the optical device.

2. The adaptor according to claim 1 further including a lens retaining means that is removably coupled within said longitudinal tubular member.

3. The adaptor according to claim 1 further including a plurality of fins disposed on the exterior surface of said longitudinal tubular member.

4. The adaptor according to claim 1 further including an image intensifier tube receiving cavity disposed between said first threaded region and said second threaded region.

5. The adaptor according to claim 1 further including an annular seat disposed between said first threaded region and said second threaded region.

6. The adaptor according to claim 1 wherein said night vision device is an AN/PVS-7B.

7. A night vision assembly comprising:

a night vision device having an externally threaded male housing section for mounting an objective lens assembly;

an optical device having an externally threaded male mounting section;

a mounting adapter comprising:

a longitudinal tubular member having a first end and a second end;

a first internally threaded region disposed on the internal surface of said first end of said longitudinal tubular member, said first threaded region for receiving said externally threaded male housing section of said night vision device; and a second internally threaded region on the internal surface of said second end of said longitudinal tubular member, said second threaded region for receiving said externally threaded male mounting section of said optical device.

8. The night vision assembly according to claim 7 wherein said night vision device is an AN/PVS-7B.

9. The night vision assembly according to claim 7 wherein said optical device is a lens.

10. The night vision assembly according to claim 9 wherein said lens is a TV lens.

11. The night vision assembly according to claim 7 wherein said mounting adapter further includes a lens retaining means that is removably coupled within said longitudinal tubular member.

12. The night vision assembly according to claim 7 further including a plurality of fins disposed on the exterior surface of said longitudinal tubular member.

13. The night vision assembly according to claim 7 further including an image intensifier tube receiving cavity disposed between said first threaded region and said second threaded region of said mounting adapter.

14. The night vision assembly according to claim 7 wherein said longitudinal tubular member has an exterior surface that tapers from a wider first end to a narrower second end.

* * * * *